No. 868,661. PATENTED OCT. 22, 1907.
M. HARDSOCG.
PNEUMATIC AND OTHER DRILL.
APPLICATION FILED FEB. 20, 1906.

Witnesses
Wm P. Bond
Pierson N. Banning

Inventor:
Martin Hardsocg
by Banning & Banning
Attys

UNITED STATES PATENT OFFICE.

MARTIN HARDSOCG, OF OTTUMWA, IOWA.

PNEUMATIC AND OTHER DRILL.

No. 868,661.

Specification of Letters Patent.

Patented Oct. 22, 1907.

Application filed February 20, 1906. Serial No. 302,049.

*To all whom it may concern:*

Be it known that I, MARTIN HARDSOCG, a citizen of the United States, residing at Ottumwa, in the county of Wapello and State of Iowa, have invented certain new and useful Improvements in Pneumatic and other Drills, of which the following is a specification.

The use of pneumatic and other drills is attended with the production of a fine dust which is thown off by the cutting of the drill and accumulates in the bit of the drill, interfering with the cutting operation, and in addition this fine dust or particles impregnate the air and are objectionable for that reason.

The object of the present invention is to construct a drill with a shank or stem by which the dust or fine particles will be removed or taken away and not interfere with the operation of the cutting, or to impregnate the air.

The invention consists in the features of construction and combinations of parts hereinafter described and claimed.

Figure 1:
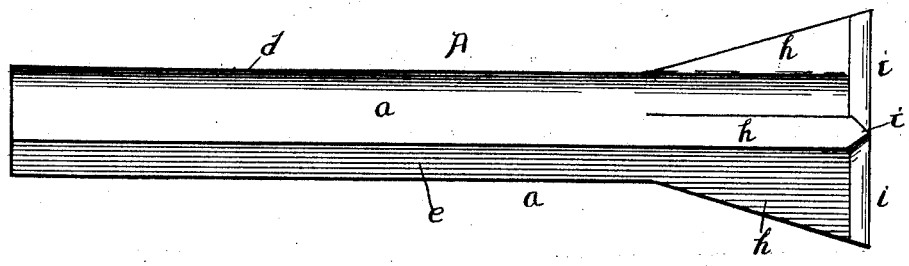
Figure 2:
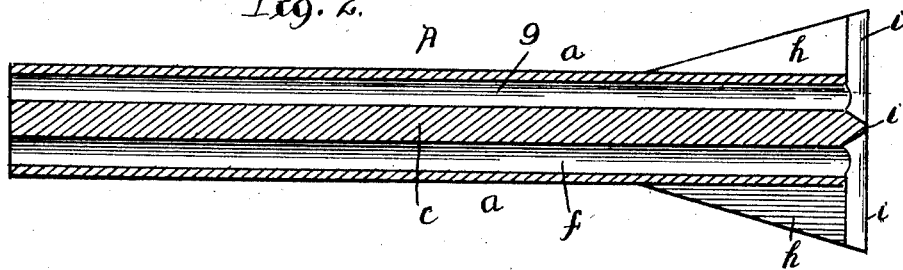
Figure 3:
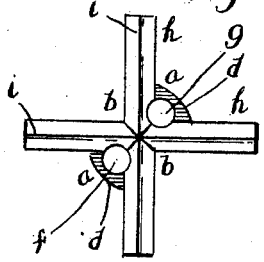
Figure 4:
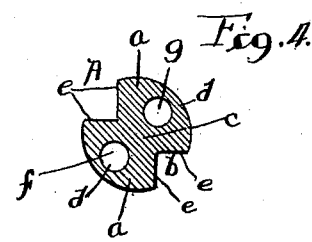

In the drawings Figure 1 is a side elevation of a drill having four cutters or bits; Fig. 2 a sectional elevation of the drill shown in Fig. 1; Fig. 3 an end elevation of the drill shown in Fig. 1; Fig. 4 a cross section of the shank or stem of the drill of Fig. 1.

The drill shown has a shank or stem A formed of two wings $a$, separated by V shaped cuts $b$ on each side and connected by a center or web $c$ between the cuts, as shown in Fig. 4. Each wing $a$ has an exterior circular or curved face $d$ and two opposite flat or straight faces $e$, as shown in Fig. 4. The flat faces $e$ are of a shape to enable the acting end of the drill to be upset and furnish cross heads for four cutters or blades, one cutter or blade for each side flat face of the wings of the shank or stem, as shown in Fig. 3. Each wing $a$ of the shank or stem has extending longitudinally therethrough a hole or passage. The hole or passage $f$ of one wing is for supplying air under pressure, or other fluid or liquid, to the acting end of the drill, for keeping the cutters or blades cool and in operative shape. The longitudinal hole or passage $g$ in the other wing receives the air under pressure from the acting end of the drill for the air to flow back and carry with it the fine dust and fine particles away from the cutters or blades, thereby keeping the acting end of the drill perfectly clear and free from becoming clogged and inoperative from the fine dust or particles, and also at the same time preventing the dust and fine particles from passing out of the hole or opening being cut by the drill into the atmosphere.

It will thus be seen that with the drill of the present invention a supply passage for air under pressure or other cooling medium, is furnished, and a passage for withdrawing the fine dust and particles from the acting end of the drill is provided, so that in use the drill at its acting end is maintained cool and cannot become clogged or interfered with by fine dust or particles. The passage $g$ can be connected with a hose or other withdrawing means, if so desired, so as to insure the removal of the fine dust and particles entirely from the shank or stem, leaving a clear passage through the shank or stem of the drill for the discharge of the fine dust or particles.

The acting end of the shank or stem is upset so as to form, on each flat or straight face $e$, a cutter or blade outwardly tapered from the body of the shank or stem as shown in Figs. 1 and 2; and each bit or blade $h$ has a cutting edge $i$ for performing the cutting operation. The hole or passage $f$ for the air or other medium opens between two adjoining bits or blades, as shown in Fig. 3, so that air or other medium will be properly delivered to the cutting edges of the bits or blades, and the discharge hole or passage $g$, for withdrawing the air or other medium and the fine dust and particles commingled therewith, likewise opens between two adjoining cutters or blades, as shown in Fig. 3, so that the air or other medium, under pressure, will flow back through the hole or passage and carry with it the fine dust and fine particles for discharge at the rear end of the shank or stem.

The drill of the present invention has a shank or stem with four cutters or blades formed integral, and in use, the passage $f$ will supply air or other medium to maintain the cutting end of the drill or tool in a cool condition and operative; and the hole or passage $g$ will furnish an exit through which the dust and fine particles can be withdrawn, keeping the acting end of the tool free from dust or fine particles, and preventing the escape of dust and fine particles into the atmosphere.

The drill of the present invention, furnishes, by the shank or stem thereof, the means for supplying a cooling or other medium to the acting end, and a means for preventing the accumulation of dust or particles at the acting end of the drill, and by which means the dust or fine particles will be removed in an effective and reliable manner, so long as the cooling medium is supplied; and it will be understood that in the event the cooling medium is not of a nature to furnish a blast for withdrawing the fine dust or particles, a suction can be produced through the hole or passage $g$ by which the dust and fine particles can be withdrawn from the acting end of the drill.

What I claim as new and desire to secure by Letters Patent is:

1. A shank for a pneumatic tool formed of two wings and a solid center, each wing having an exterior with a curved face and two opposite flat faces furnishing end faces to produce four bits or blades, each with a cutting edge, and each wing having a longitudinal passage extending through its body, one passage for admitting a cooling medium to the acting end of the tool and the other passage for withdrawing dust and fine particles from around the acting end of the tool, substantially as described.

2. A shank for a pneumatic tool formed of two wings and a solid center, each wing having an exterior with a curved face and two opposite flat faces, furnishing end faces to produce four bits or blades, each with a cutting edge, and each wing having a longitudinal passage extending through its body, each passage opening between two adjoining cutters, one passage for admitting a cooling medium to the acting end of the tool and the other passage for withdrawing dust and fine particles from around the acting end of the tool, substantially as described.

MARTIN HARDSOCG.

Witnesses:
MERRILL C. GILMORE,
EDWIN G. MOON.